March 16, 1971 — H. B. TOZIER — 3,570,164
MULTIPLE ACTION ROD
Filed July 23, 1968

Howard B. Tozier INVENTOR

ATTORNEY

3,570,164
MULTIPLE ACTION ROD
Howard B. Tozier, Kenilworth, N.J.
(12 Canterbury St., Andover, Mass. 01810)
Filed July 23, 1968, Ser. No. 746,872
Int. Cl. A01k 87/00
U.S. Cl. 43—18      3 Claims

ABSTRACT OF THE DISCLOSURE

An elongated hollow rod member has a main rod portion, a tip portion and a butt portion. The hollow rod member is adapted to receive a flexible core member within the hollow space provided inside the rod member. The internal core member is adapted to be moved to and from the tip portion of the rod. Optionally, the total rod assembly may be provided with means for adjusting the extent to which the core member extends into the tip portion of the rod. The fishing rod assembly permits the use of a stiff action rod for casting and a fast action rod useful for imparting natural movement to the lure employed by the fisherman.

---

The present invention relates to an improved multiple action fishing rod. More particularly, the present invention relates to a fishing rod assembly composed of an elongated, essentially hollow rod member and a flexible core member positioned within said rod which core member is adapted to be moved to and from the tip portion of the rod.

BACKGROUND OF THE INVENTION

Numerous types of fishing rod constructions are available that possess varying actions or degrees of stiffness. The fisherman, especially the salt water fisherman, normally employs a very stiff action rod to permit him to cast the bait or lure employed a great distance. With a stiff action rod a great deal of skill is necessary to impart a natural movement to the lure used. With a very flexible or fast action rod the desired bait action can be easily imparted; however, long distance casting is not possible. Thus, the fisherman desires to have a rod assembly that will permit him to cast the bait or lure long distances but which can be converted to the fast action type of rod for the lure retrieving phase.

Various types of rod constructions have been proposed by the prior art workers to provide the desired multiple action fishing rod. However, these constructions tended to be complex mechanical systems having various types of tensioning means which were difficult to manipulate and subject to corrosion, especially in salt water environments. Examples of constructions of this type are found in U.S. 2,351,734; U.S. 2,478,131; U.S. 2,210,231 and U.S. 2,759,288.

SUMMARY OF THE INVENTION

Now, in accordance with the present invention, it has been found that a multiple action fishing rod assembly can be provided that does not possess the drawbacks of prior art devices. The present multiple action fishing rod assembly consists first of all of an elongated rod member having a main rod portion, a tip portion, and a butt portion. The rod member is provided with an internal axial space extending longitudinally within the rod member from the tip portion of the rod for at least a portion of the length of the remainder of the rod. The internal axial space is provided with a flexible core member. The core member is adapted to be moved to or from the tip portion of the rod member. By moving the flexible core member completely within the tip portion of the rod, a fishing rod of maximum stiffness is secured. In contradiction, when the core member is withdrawn from the tip portion of the rod, the rod exhibits fast action characteristics.

BRIEF DESCRIPTION OF THE DRAWINGS

The invention will be more readily understood through reference to the accompanying drawings, in which.

DESCRIPTION OF THE PREFERRED EMBODIMENT

Figure 1:
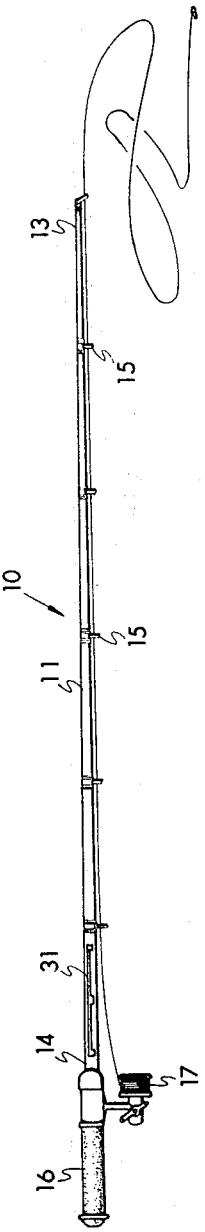
FIG. 1 is a side view of a casting rod embodying features of the present invention.

Referring now to the drawings and in particular to FIG. 1 a spinning rod assembly is shown formed of a fiberglass rod member 11 having a main rod portion 12, a tip portion 13, and a butt portion 14. The elongated rod member 11 is provided with the usual eyelets 15 through which the fishing rod is threaded, a grip 16 (which is formed of cork, or a thermoplastic material or the like) which is fixed to the butt portion 14 of the rod, and a spinning reel 17 which is mounted on grip 16 near the right end thereof.

Figure 2:
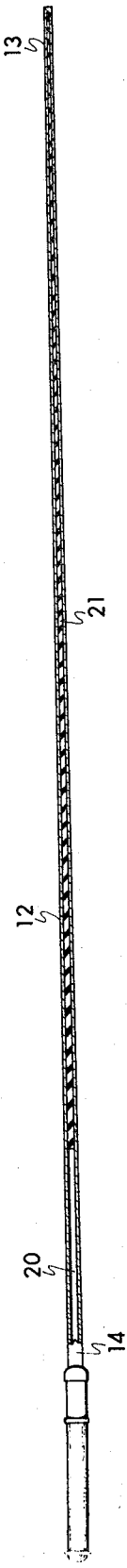
FIG. 2 is a longitudinal cross-sectional view of the fishing rod assembly.

In FIG. 2 is shown a cross-sectional view of the rod assembly taken along the longitudinal axis of the rod. As shown in FIG. 2 the elongated rod member 11 is provided with an internal axial space 20 that extends longitudinally within the rod member from the tip portion 13 of the rod for at least a portion of the total length of the main rod portion 12. Normally, axial space 20 will run substantially the full length of the rod. The internal axial space 20 is provided with a flexible core member 21 that is positioned within a portion of the length of the internal axial space 20. Core member 21 is of a length less than the total length of axial space 20. Core member 21 is adapted to slide within space 20 in substantial contact with the inside wall of the rod and moved to and from the tip portion 13 of the rod member 11. When core member 21 is positioned completely within the tip of the rod member, the rod possesses its maximum casting stiffness characteristics. In contrast when core member 21 is withdrawn fully from the tip portion 13 of rod 11, the total rod assembly exhibits its fastest action.

The tip portion 13 of the rod member 11 varies from 10 to 45%, more generally from 15 to 40%, of the length of the rod member 11. Main rod portion 12 constitutes from 30 to 80% of the total length of rod member 11. Ordinarily, at least the tip portion of the rod member is tapered, that is, the tip portion of the rod member has an increasingly smaller diameter as one progresses to the end of the tip portion of the rod. Core member 21 and axial space 20 are adapted to such that the flexible core member can be moved within substantially the full length of the tip portion 13 of the rod.

Figure 3:
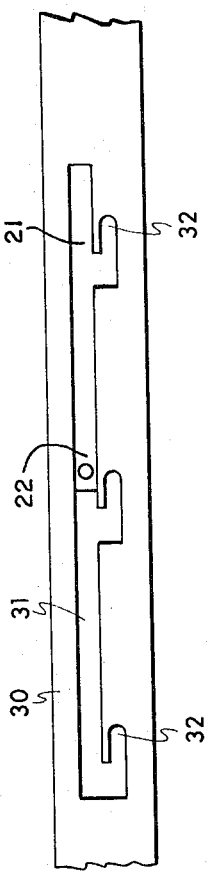
FIG. 3 is an enlarged cross-sectional view of the rod segment embodying the means for moving the core member of the rod assembly to or from the tip portion of the rod member.

The total rod assembly is further provided with the means for moving the core member within the axial space of the main rod portion to or from the tip portion of the rod. Optionally, the rod assembly is provided with means for positioning the flexible internal core member at various points within the main portion of the rod. One device for moving and positioning the core member at various points within the rod assembly is shown in FIG. 3. Latch system 30 is composed of slot 31 and a plurality of locking spaces 32. In one embodiment of the present invention, the butt portion of core 21 is provided with a travelling bar 22 which is positioned within slot 31.

When the travelling bar 22 is pulled toward the butt portion of the rod, core member 21 is withdrawn from the tip portion of the rod thereby causing the rod to have a faster action. Conversely, when the travelling bar 22 is positioned within the slot at a point closest to the tip of the rod, the core member is located to its fullest extent within the tip portion of the rod. The core member is locked into place by slipping the travelling bar 22 into locking spaces 32.

Other more sophisticated mechanisms may be devised for moving core member 21 within the rod member to and from the tip portion of the rod member. For example, the core member 21 may be placed under spring tension such as to either push or pull the tip portion of core member 21 to or from tip portion 13 of rod assembly 12. Thus, a spring may be placed within the axial space of the rod, between the tip of the core member and inside tip of the rod whereby the core member will tend to be forced backwardly toward butt portion of the rod. The progress of the core member can be regulated by installing a plurality of shutter mechanisms in series near the butt portion of the rod. Hence, when the shutter mechanisms are released the core member will be forced further and further and further away from the tip portion of the rod thereby increasing the action of the rod. When it is desired to increase the stiffness of the rod the core member may be forced back into the tip portion of the rod by means of a travelling bar as per FIG. 3 or by means of an internal push rod. Thereafter, the shutter mechanisms may be reset to hold the core member in position within the tip of the rod assembly.

The rod member may be formed from many different types of materials. Representative, non-limiting examples of useful materials include fiberglass; steel, reinforced and non-reinforced polymeric substances such as polyethylene, polypropylene, fiberglass reinforced polyamides, etc.; stainless steel, polymer coated steel; etc. Similarly, many different types of materials may be employed in the construction of the core member 21. It is desired that the core member be formed of a material that is resistant to fresh and salt water corrosion and which has a low coefficient of friction with respect to the materials from which the rod is manufactured. Since the core member slides within the rod, the core member may be lubricated with graphite or the like to improve the sliding action. Useful core materials include cured and uncured rubbery materials, such as natural rubber, butyl rubber, terpolymers of ethylene, propylene and a non-conjugated diene, ethylene-propylene copolymers; polyethylene; polypropylene; etc. The degree of stiffness of the rod can be varied by varying the type of material used to form the core member.

Desirably, the rod member and core member are of a tubular configuration and are tapered to a progressively smaller cross-sectional area progressing toward the tip portion of the rod. The total rod assembly, including the core member, may be unitary or may be formed from a plurality of components.

What is claimed is:

1. A multiple action fishing rod comprising in combination:
   (a) an elongated rod member having a main rod portion, a tip portion, and a butt portion, said rod member provided with an internal axial space extending longitudinally within said rod member from said tip portion for at least a portion of the length of said rod portion;
   (b) a flexible core member of a length less than the total length of said axial space, said core member being slidably positioned within at least a portion of said axial space and being movable within said axial space to and from the tip portion of said rod member; and
   (c) means connected to said core member for moving said core member within said rod member to and from the tip portion of said rod member.

2. The apparatus of claim 1 wherein said elongated rod member has a substantially tubular configuration.

3. The apparatus of claim 2 wherein said elongated rod member, internal axial space, and flexible core member are tapered to a progressively smaller cross sectional area progressing toward the tip portion of said rod.

References Cited

UNITED STATES PATENTS

| | | | |
|---|---|---|---|
| 250,842 | 12/1881 | Rippard | 43—18 |
| 662,748 | 11/1900 | Wood | 43—18X |
| 1,385,149 | 7/1921 | Rawson | 43—18 |
| 2,816,389 | 12/1957 | Sens | 43—18 |
| 3,461,593 | 8/1969 | Martuch et al. | 43—18 |

WARNER H. CAMP, Primary Examiner